United States Patent
Pfaff et al.

(10) Patent No.: US 9,244,463 B2
(45) Date of Patent: Jan. 26, 2016

(54) AUTOMATED GUIDED VEHICLE AND METHOD OF OPERATING AN AUTOMATED GUIDED VEHICLE

(71) Applicant: KUKA Laboratories GmbH, Augsburg (DE)

(72) Inventors: Patrick Pfaff, Augsburg (DE); Bjorn Klein, Friedberg (DE); Christoph Bick, Augsburg (DE)

(73) Assignee: KUKA Roboter GmbH, Augsburg (DE)

( * ) Notice: Subject to any disclaimer, the term of this patent is extended or adjusted under 35 U.S.C. 154(b) by 0 days.

(21) Appl. No.: 14/308,067

(22) Filed: Jun. 18, 2014

(65) Prior Publication Data

US 2014/0371973 A1      Dec. 18, 2014

(30) Foreign Application Priority Data

Jun. 18, 2013   (DE) .................. 10 2013 211 414

(51) Int. Cl.
*G05D 1/00*   (2006.01)
*G05D 1/02*   (2006.01)

(52) U.S. Cl.
CPC ............ *G05D 1/0088* (2013.01); *G05D 1/0221* (2013.01); *G05D 1/0248* (2013.01); *G05D 1/0274* (2013.01); *G05D 2201/0216* (2013.01); *Y10S 901/09* (2013.01)

(58) Field of Classification Search
USPC .................. 701/23, 28, 26; 700/245, 262
See application file for complete search history.

(56) References Cited

U.S. PATENT DOCUMENTS

| | | | |
|---|---|---|---|
| 5,111,401 A * | 5/1992 | Everett et al. | 701/24 |
| 6,041,274 A | 3/2000 | Onishi et al. | |
| 6,256,560 B1 | 7/2001 | Kim et al. | |
| 6,493,614 B1 | 12/2002 | Jung | |
| 2006/0195226 A1* | 8/2006 | Matsukawa et al. | 700/245 |
| 2007/0103107 A1 | 5/2007 | Hayashi | |

FOREIGN PATENT DOCUMENTS

| | | |
|---|---|---|
| DE | 102012207269 A1 | 11/2013 |
| TW | 201323300 A | 6/2013 |
| WO | 2007047510 A2 | 4/2007 |
| WO | 2012140188 A1 | 10/2012 |

OTHER PUBLICATIONS

German Patent Office; Office Action in German Patent Application No. 10 2013 211 414.1 dated May 9, 2014; 9 pages.
European Patent Office; Office Action in European Patent Application No. 14170119.3 dated Oct. 13, 2015; 8 pages.

* cited by examiner

*Primary Examiner* — Yonel Beaulieu
(74) *Attorney, Agent, or Firm* — Wood, Herron & Evans, LLP

(57) ABSTRACT

The invention relates to an automated guided vehicle and a method for operating an automated guided vehicle. Upon arriving at a destination, then the automated guided vehicle is moved, based on a comparison of signals or data assigned to the environment detected by at least one sensor with signals or data which are assigned to a target position or to a target position and orientation of the automated guided vehicle at the destination, such that the actual position or the actual position and orientation is the same as the target position or target position and orientation at least within a pre-specified tolerance.

11 Claims, 2 Drawing Sheets

AUTOMATED GUIDED VEHICLE AND METHOD OF OPERATING AN AUTOMATED GUIDED VEHICLE

CROSS-REFERENCE

This application claims the benefit of German Patent Application No. 10 2013 211 414.4 (pending), filed Jun. 18, 2013, the disclosure of which is incorporated by reference herein in its entirety.

TECHNICAL FIELD

The invention relates to automated guided vehicles and methods for operating automated guided vehicles.

BACKGROUND

An automated guided vehicle (AGV) is understood to be an automatically guided floor-bound vehicle with its own drive. Automated guided vehicles are, for example, mobile robots. Automated guided vehicles are configured, in particular, to automatically approach a destination in order to stop there.

The object of the invention it to provide a method for operating an automated guided vehicle, which enables the automated guided vehicle to better assume the target position or target position and orientation. A further object of the invention is to provide a corresponding automated guided vehicle.

SUMMARY

The object of the invention is solved by a method for operating an automated guided vehicle comprising the following steps:
a) automatic movement of the automated guided vehicle from a starting point to a destination, in particular controlled by means of a control device of the automated guided vehicle,
b) after an automatic stopping of the automated guided vehicle at the destination, automatic detection of the environment at the destination using at least one sensor of the automated guided vehicle,
c) comparison, in particular by means of the control device of the automated guided vehicle, of the signals or data assigned to the environment detected by means of the at least one sensor with signals or data, which are assigned to a target position or target position and orientation of the automated guided vehicle at the destination, and
d) automatic movement of the automated guided vehicle, in particular controlled by the control device, based on the comparison of the signals or data assigned to the environment detected by means of the at least one sensor with signals or data, which are assigned to a target position or target orientation of the automated guided vehicle at the destination, such that the actual position or actual position and orientation is the same as the target position or target position and orientation at least within a pre-specified tolerance.

A further aspect of the invention relates to an automated guided vehicle, comprising a vehicle base body, multiple wheels mounted rotatably relative to the vehicle base body for moving the automated guided vehicle, at least one drive coupled to at least one of the wheels for driving the corresponding wheel, a memory in which signals or data are stored, which signals or data are assigned to a target position or a target position and orientation of the automated guided vehicle at a destination, and at least one sensor which is equipped to detect the environment at the destination in order to obtain signals or data which are assigned to the actual position or actual position and orientation of the automated guided vehicle, and a control device coupled to the at least one drive, the memory, and the at least one sensor, which control device is equipped to control the at least one wheel such that the automated guided vehicle implements the inventive method.

The inventive automated guided vehicle is preferably an omnidirectional automated guided vehicle, which can move substantially in all directions on the driving plane. The wheel, or the wheels, of the inventive automated guided vehicle is accordingly preferably an omnidirectional wheel, or are accordingly omnidirectional wheels. Omnidirectional wheels are designated as mecanum wheels. Wheels of this type comprise for example a rotatably mounted wheel-rim on which multiple, unpowered rollers are mounted. The wheel-rim can be driven using one drive.

According to a variant of the inventive automated guided vehicle, it has at least one robotic arm, which has multiple links arranged connected in series via joints. The robotic arm is moved preferably by means of the control device of the automated guided vehicle.

According to the inventive method, the automated guided vehicle moves itself automatically from the starting point to the destination. This takes place preferably by means of the control device, which correspondingly controls the wheels of the automated guided vehicle. The automatic movement of the automated guided vehicle from the starting point to the destination takes place for example using path planning. Path planning as such is known in principle to the person skilled in the art. It is implemented prior to starting the automated guided vehicle, for example, by means of the control device of the automated guided vehicle or by means of a central control device. A centrally implemented path planning can be advantageous, if multiple automated guided vehicles are used. The path planning is based, for example, on a digital map of the route between the starting point and the destination, which map is, for example, stored in the memory. The digital map can have been generated, for example, according to the following method steps prior to step a):
  manual movement of the automated guided vehicle from the starting point to the destination,
  detection of the environment by means of the at least one sensor of the automated guided vehicle in order to obtain the digital map of the route between the starting point and the destination during the manual movement of the automated guided vehicle, and
  storing the digital map in particular in a memory coupled with the control device of the automated guided vehicle.

The automated guided vehicle can also be stopped during the detection of the environment by means of the at least one sensor.

Upon arrival at the destination, the automated guided vehicle does not generally occupy the desired target position or target position and orientation. In order that the automated guided vehicle can better occupy the target location or target position and orientation at the destination after the automated guided vehicle has reached the destination, and stopped there, the environment at the destination is automatically detected using the at least one sensor. "Detecting" is understood to mean in particular a scanning of the environment or recording images of the environment of the destination. The signals or data originating from the at least one sensor can be processed and/or evaluated, for example, by means of image data processing in particular by means of the control device.

The at least one sensor comprises, for example, at least one laser scanner and/or at least one camera. The at least one sensor comprises, for example, a 2D laser scanner, a 3D laser scanner, an RGBD camera, and/or a Time-Of-Flight (TOF) camera. TOF cameras are 3D camera systems which measure distances using the transit time method.

Subsequently, the signals or data assigned to the environment detected by means of the at least one sensor are compared, in particular by means of the control device of the automated guided vehicle, with signals or data, which are assigned to the target position or target position and orientation of the automated guided vehicle at the destination. The comparison of the signals or data can, for example, take place via a grid-based correlative scan matching or via a norm-based scan matching if two-dimensional image data are present. In the case of three-dimensional data, the comparison of the signals or data can be carried out by a so-called ICP (Iterative Closest Point) algorithm or by so-called feature matching.

By this means, it is possible, for example, to recognize an incorrect positioning or incorrect positioning and orientation of the automated guided vehicle at the destination, and, based on this error, control the drive of the wheels in such a way such that this error is at least reduced.

Inventively, the automated guided vehicle, in particular controlled by its own control device, is subsequently moved based on the comparison of the signals or data in such a way that the actual position or actual position and orientation is the same as the target position or target position and orientation at least within a pre-specified tolerance. This can be carried out, for example, by means of a position control or position and orientation control.

According to an embodiment of the inventive method, the command variable for the position control or the position and orientation control of the target position or the target position and orientation of the automated guided vehicle and the control variable for the position control or the position and orientation control of the actual position or the actual position and orientation of the automated guided vehicle is assigned to the destination.

In order that the actual position or actual position and orientation of the automated guided vehicle at the destination lies within the pre-specified tolerance, steps b) to d) can be repeated correspondingly often.

In order to obtain the signals or data assigned to the target position or target position and orientation at the destination, it can be provided according to an embodiment of the inventive method that the following steps are implemented prior to step a):

manual movement of the automated guided vehicle to the destination and aligning the automated guided vehicle such that it occupies the target position and orientation, detecting the environment at the destination using the at least one sensor of the automated guided vehicle in order to obtain signals or data which are assigned to the target position or to the target position and orientation of the automated guided vehicle at the destination, and storing the signals or data which are assigned to the target position or to the target position and orientation of the automated guided vehicle in a memory of the automated guided vehicle, which memory is coupled to the control device.

Based on the inventive method, it is in particular possible to realize the positioning of the automated guided vehicle at the destinations thereof solely by means of the data which is available via already present sensors for navigation and collision avoidance. These include 2D laser scanners, which are used for localizing the automated guided vehicle, or 3D sensors, which are used for example for vehicle protection or collision avoidance, among others. By this means, the expense for the sensor system can be reduced.

According to the embodiment of the inventive method, a position or a position and orientation can for example initially be taught, which position or position and orientation the automated guided vehicle should afterwards approach repeatedly with a relatively high accuracy. For this purpose, the automated guided vehicle is brought to this position (destination) in order to record preferably all available sensor data at this point. These sensor data are, for example, distance measurements, which can be present in two dimensions or also in three dimensions.

According to the embodiment of the inventive method, the following steps can be implemented:

1. Positioning: For example during start-up of the automated guided vehicle, a person places the automated guided vehicle at the position in the space, which position should later be precisely approached (destination).
2. Teaching: In this step, the person can now record (teach), for example, via a specific user interface, all of the sensor data and positioning information, which are available to the automated guided vehicle. These data can comprise current measurements of the at least one sensor, a localized position in the map of the environment or a digital map, data from sensors, such as cameras.
3. Move into position: The automated guided vehicle drives autonomously to the learned position, for example, to the destination, using, for example, the path planner.
4. Reference measurement: After the automated guided vehicle has stopped, the signals or data, which were previously stored for this position during the learning step, are compared with the signals or data that are currently available from the sensors. An offset or error can be calculated, for example, using geometrical or mathematical calculations, from this comparison.
5. Error correction: The automated guided vehicle now automatically compensates for the measured error at least within the pre-specified tolerance. With regard to holonomic drive designs, such as, for example, the omnidirectional wheel, this error correction can be achieved by a relatively highly-accurate position control or position and orientation control.
6. Iteration step: According to the required accuracy, steps 4 and 5 can be repeated until the error calculated in step 4 can no longer be significantly reduced or lies within a pre-specified tolerance.

BRIEF DESCRIPTION OF THE DRAWINGS

An embodiment of the invention is depicted as an example in the schematic figures included. Shown are.

DETAILED DESCRIPTION

Figure 1:
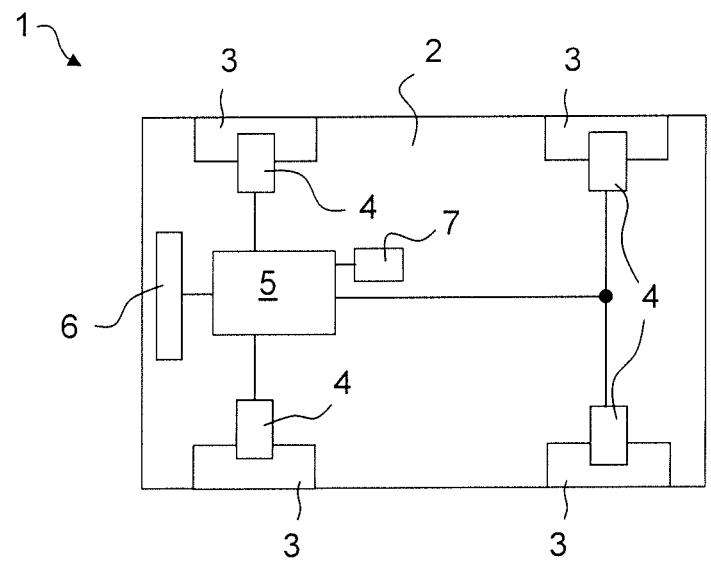
FIG. 1 a top view of an automated guided vehicle.
Figure 2:
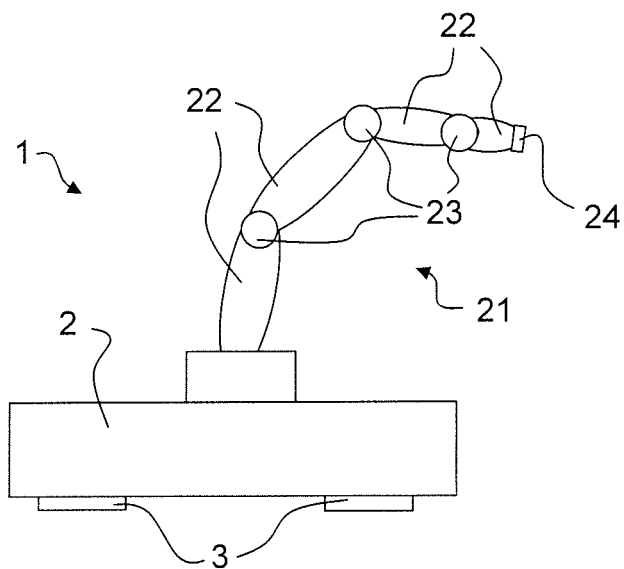
FIG. 2 a side view of the automated guided vehicle.

FIG. 1 schematically shows in a top view an automated guided vehicle 1 and FIG. 2 shows a side view of the automated guided vehicle 1.

The automated guided vehicle 1 is preferably designed in such a way that it can move freely in all directions. The automated guided vehicle 1 is in particular designed as an onmidirectionally, moveable, automated guided vehicle 1. The automated guided vehicle 1 can be a mobile robot, which comprises a robotic arm 21 having multiple links 22 arranged connected in series via joints 23. The robotic arm 21 comprises, in particular, a fastening device, for example, in the form of a flange 24, to which an end-effector (not depicted in more detail) can be fastened.

In the case of the present embodiment, the automated guided vehicle 1 has a vehicle base body 2 and multiple omnidirectional wheels 3, which are designated as mecanum wheels. Wheels of this type comprise, for example, a rotatably mounted wheel-rim on which multiple, unpowered rollers are mounted. The wheel-rim can be driven using a drive. In the case of the present embodiment, the wheels 3 are each driven by an electric drive 4. The drives are preferably controlled electric drives.

The automated guided vehicle 1 further has a control device 5 arranged on the vehicle base body 2, which control device is connected to the drives 4. As appropriate, the control device can also control the movement of the robotic arm 21, if it is present.

Figure 3:
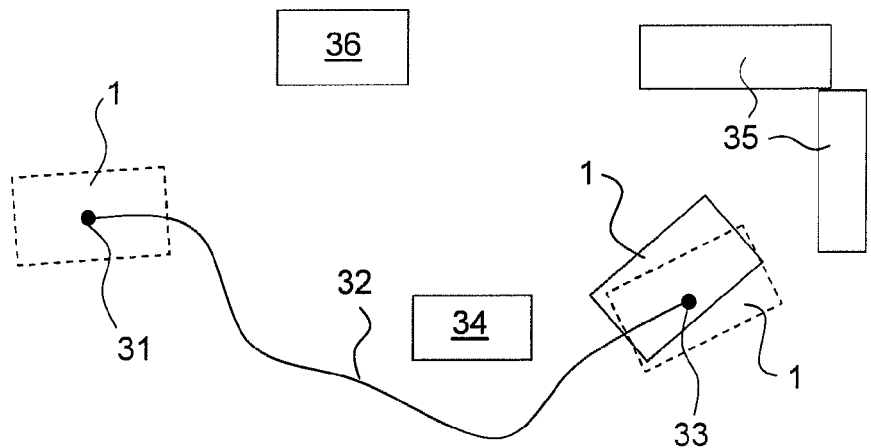
FIG. 3 a movement of the automated guided vehicle from FIGS. 1 and 2, and FIG. 4 a flow chart for visualizing the operation of the automated guided vehicle from FIGS. 1 and 2.

A computing program runs on the control device 5, which program controls the drives 4 in such a way that said drives automatically move the automated guided vehicle 1 from a starting point 31 shown in FIG. 3, for example, along a route 32 to a destination 33.

The automated guided vehicle 1 further comprises at least one sensor 6 arranged, for example, on the vehicle base body 2 and connected to the control device 5. The sensor or sensors 6 comprise, for example, at least one laser scanner and/or at least one camera, and are provided to detect and/or scan the environment 34, 35 of the automated guided vehicle 1 and/or to generate images of the environment 34, 35 of the automated guided vehicle 1. The control device 5 is in turn equipped for processing or evaluating the signals or data originating from the sensors 6, for example, by means of image data processing. The at least one sensor 6 comprises, for example, a 2D laser scanner, a 3D laser scanner, an RGBD camera, and/or a Time-Of-Flight (TOF) camera. TOF cameras are 3D camera systems which measure distances using the transit time method.

In the case of the present embodiment, the automated guided vehicle 1 is designed to automatically move itself within a specific environment from the starting point 31 to the destination 33 in particular along the route 32. In addition, in the case of the present embodiment, a virtual map or a digital map of the specific environment 34, 35, in which the automated guided vehicle 1 should move itself, is stored, for example, in the control device 5. The environment 34, 35 is, for example, a hall. The digital map was generated, for example, by a so-called SLAM method, for example, based on signals or data from the sensors 6 and/or based on wheel sensors (not depicted in more detail) assigned to the wheels 3. The digital map is stored, for example, in a memory 7 of the automated guided vehicle 1, which memory is coupled to the control device 5. The digital map can also or additionally be stored in a central control device 36.

The SLAM method is a method for simultaneous localization and mapping generation (Simultaneous Localization and Mapping). The automated guided vehicle 1 can generate the digital map of its environment by means of the SLAM method and, as appropriate, estimate its position, in addition, as appropriate, its orientation as well, within the digital map.

For example, for the online programming, the automated guided vehicle 1 was moved manually, for example, physically, along the route 32 to be traveled, and during the manual movement in particular individual positions or positions and orientations were stored in the memory 7. This takes place, for example, analogous to the so-called teaching of industrial robots. The automated guided vehicle 1 can, for example, be manually moved by means of a joystick.

The control device 5 is, for example, designed in such a way for this case, that said control device detects the current position, in which the automated guided vehicle 1 is located, based on the signals or data originating from the sensors 6.

It is also possible that only the starting point 31 and destination 33 are "taught," thus are stored, for example, by moving the automated guided vehicle 1 to the corresponding physical starting point 31 and destination 33. The control device 5 is then, for example, designed in such a way to automatically generate the route 32 preferably allowing for the handling or driving ability of the automated guided vehicle 1. For this purpose, information about the handling or the driving ability of the automated guided vehicle 1 can be stored in the control device 5.

For example, for offline programming, the route 32 is directly entered into the control device 5. This can be carried out, for example, in that the control device 5 is connected to a touch screen (not depicted in more detail), on which the digital map is displayed. As a result, the route can be plotted by correspondingly touching the touch screen in the digital map displayed thereon. The control device 5 can, as appropriate, adapt the plotted route 32 allowing for the handling or driving ability of the automated guided vehicle 1.

It is also possible that only the starting point 31 and the destination 33 are plotted. The control device 5 is then designed in such a way, for example, to automatically calculate the route 32. The control device 5 is then designed in such a way, for example, to automatically generate the route 32, preferably allowing for the handling or driving ability of the automated guided vehicle 1.

If the automated guided vehicle 1 should now travel the route 32 then, for example, the automated guided vehicle 1 is moved to the starting point 31. This can take place automatically in that, for example, the automated guided vehicle 1 maps its environment 34 by means of the sensors 6, and the control device 5 automatically approaches the starting position 31, for example, based on an image data evaluation of the signals or data originating from the sensors 6.

Subsequently, the automated guided vehicle 1 automatically travels the route 32 based on a localization of its position in the digital map, as appropriate, also based on the signals or data originating from the sensors 6, thus based on path planning. The path planning can also be implemented by means of the central control device 36, wherein the result of the path planning is transmitted in particular wirelessly to the automated guided vehicle 1.

When the automated guided vehicle 1 has arrived at the destination 33, it stops. In general, however, it has not yet exactly assumed its target position or target position and orientation, at least within a pre-specified tolerance. The automated guided vehicle 1 is depicted in FIG. 3 by dashed lines in its actual position and orientation after it stops.

Figure 4:
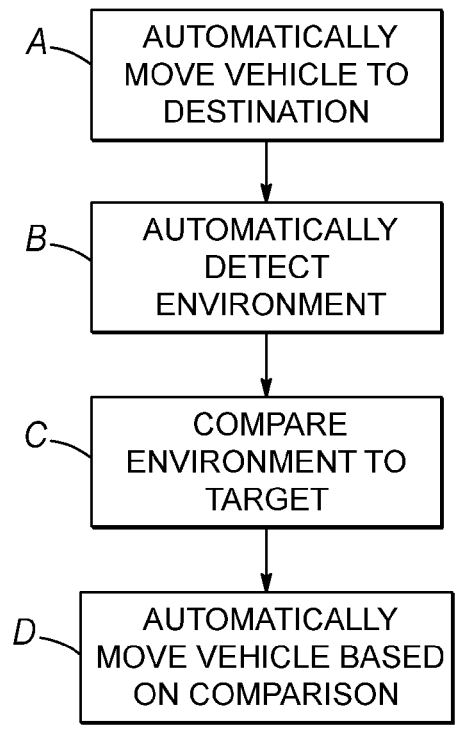

In the case of the present embodiment, a computing program runs on the control device 5, which program automatically moves the automated guided vehicle 1 after the stopping of the same in such a way that the automated guided vehicle 1 assumes the target position or target position and orientation at the destination 33 at least within the pre-specified tolerance. This takes place through a corresponding actuation of the drives 4 of the wheels 3. The individual steps for this movement are summarized by means of a flow chart shown in FIG. 4.

As already described above, initially the automated guided vehicle 1 is automatically moved from the starting point 31 to the destination 33 controlled by means of its control device 5, in particular along the route 32 and in particular based on path planning, step A of the flow chart.

After the automatic stopping of the automated guided vehicle 1 at the destination 33, the at least one sensor 6 automatically detects the environment 35 at the destination 33, step B of the flow chart.

Subsequently, the signals or data assigned to the environment 35 detected by means of the at least one sensor 6 are compared to signals or data, which are assigned to the target position or target position and orientation of the automated guided vehicle 1 at the destination 33 by means of the control device 5 of the automated guided vehicle 1, step C of the flow chart.

The comparison of the signals or data can, for example, take place via a grid-based correlative scan matching or via a norm-based scan matching if two-dimensional image data are present. In the case of three-dimensional data, the comparison of the signals or data can be carried out by a so-called ICP (Iterative Closest Point) algorithm or by so-called feature matching.

The signals or data, which are assigned at the destination 33 to the target position or target position and orientation of the automated guided vehicle 1, are stored in particular in the memory 7. The signals or data are obtained in the case of the present embodiment in that, within the context of the programming of the automated guided vehicle 1, the vehicle was moved in particular manually to the destination 33, and is subsequently aligned and in such a way that the automated guided vehicle assumes its target position, preferably its target position and orientation.

Subsequently, the environment 35 is detected at the destination 33 by means of the at least one sensor 6 in order to obtain the signals or data which are assigned to the target position or to the target position and orientation of the automated guided vehicle 1 at the destination 33. The signals or data are subsequently stored in the memory 7.

After comparison of the signals or data and/or based on this comparison, the control device 5 automatically actuates the drives 4 of the wheels 3 in such a way that the automated guided vehicle 1 automatically moves in such a way that its actual position or actual position and orientation at the destination 33 is the same as the target position or target position and orientation at the destination 33, at least within the pre-specified tolerance, step D of the flow chart. In order to achieve this, a position control or position and orientation control is preferably implemented in the control device 5, the command variable of the position control or of the position and orientation control being assigned to the target position or the target position and orientation of the automated guided vehicle 1 and the control variable of the position control or of the position and orientation control being assigned to the actual position or the actual position and orientation of the automated guided vehicle 1 at the destination 33.

As appropriate, the calculating program of the control device 5 is designed in such a way that the steps B through D are repeated until the actual position or the actual position and orientation is the same as the target position or the target position and orientation of the automated guided vehicle 1 at the destination 33 within the pre-specified tolerance.

While the present invention has been illustrated by a description of various embodiments, and while these embodiments have been described in considerable detail, it is not intended to restrict or in any way limit the scope of the appended claims to such detail. The various features shown and described herein may be used alone or in any combination. Additional advantages and modifications will readily appear to those skilled in the art. The invention in its broader aspects is therefore not limited to the specific details, representative apparatus and method, and illustrative example shown and described. Accordingly, departures may be made from such details without departing from the spirit and scope of the general inventive concept.

What is claimed is:

1. A method for operating an automated guided vehicle, the method comprising:
   (a) automatically moving an automated guided vehicle from a starting point to a destination;
   (b) automatically detecting the environment at the destination using at least one sensor of the automated guided vehicle, after automatically stopping the automated guided vehicle at the destination;
   (c) comparing signals or data assigned to the environment detected by the at least one sensor with signals or data that are assigned to a target position or target position and orientation of the automated guided vehicle at the destination; and
   (d) automatically moving the automated guided vehicle based on the comparison of the signals or data assigned to the environment detected by the at least one sensor with signals or data that are assigned to a target position or target orientation of the automated guided vehicle, such that the actual position or actual position and orientation is the same as the target position or target position and orientation, at least within a pre-specified tolerance;
   wherein automatically moving the automated guided vehicle based on the comparison of the signals or data is performed by a positioning control or a positioning and orientation control; and
   wherein a command signal for the position control or the position and orientation control of the target position or the target position and orientation of the automated guided vehicle and a controlled variable for the position control or the position and orientation control of the actual position or the actual position and orientation of the automated guided vehicle are assigned to the destination.

2. The method of claim 1, wherein at least one of automatically moving the automated guided vehicle or automatically comparing signals or data is performed by a control device of the automated guided vehicle.

3. The method of claim 1, wherein automatically moving the automated guided vehicle from the starting point to the destination comprises path planning based on a digital map of the route between the starting point and the destination.

4. The method of claim 3, wherein the digital map is stored in a memory operatively coupled with the control device of the automated guided vehicle.

5. Method of claim 3, further comprising, before step (a):
   manually moving the automated guided vehicle from the starting point to the destination;
   detecting the environment with the at least one sensor in order to obtain the digital map of the route between the starting point and the destination during the manual movement of the automated guided vehicle; and
   storing the digital map in a memory operatively coupled with the control device of the automated guided vehicle.

6. The method of claim 1, further comprising repeating steps (b) to (d) until the actual position or the actual position and orientation is the same as the target position or the target position and orientation within the pre-specified tolerance.

7. The method of claim 1, further comprising, before step (a):

manually moving the automated guided vehicle to the destination and aligning the automated guided vehicle such that it occupies the target position and orientation;

detecting the environment at the destination using at least the sensor of the automated guided vehicle in order to obtain signals or data that are assigned to the target position or to the target position and orientation of the automated guided vehicle at the destination; and storing the signals or data that are assigned to the target position or to the target position and orientation of the automated guided vehicle in a memory coupled with the control device of the automated guided vehicle.

8. An automated guided vehicle, comprising:

a vehicle base body;

a plurality of wheels rotatably mounted to the vehicle base body for moving the automated guided vehicle;

at least one drive coupled with at least one of the wheels for driving the corresponding wheel;

a memory in which signals or data are stored, the signals or data assigned to a target position or a target position and orientation of the automated guided vehicle at a destination; and at least one sensor equipped to detect the environment at the destination in order to obtain signals or data that are assigned to the target position or target position and orientation of the automated guided vehicle; and a control device operatively coupled with the at least one drive, the memory, and the at least one sensor, the control device is configured to control the at least one drive in such a way that the automated guided vehicle implements the method of claim 1.

9. The automated guided vehicle of claim 8, wherein the at least one sensor comprises at least one laser scanner and/or at least one camera.

10. The automated guided vehicle of claim 8, wherein the at least one wheel is an omnidirectional wheel.

11. The automated guided vehicle of claim 8, further comprising a robotic arm operatively coupled with the vehicle base body and having a plurality of links connected in series via joints.

\* \* \* \* \*